US009269386B1

(12) United States Patent
Xi et al.

(10) Patent No.: US 9,269,386 B1
(45) Date of Patent: *Feb. 23, 2016

(54) DATA STORAGE DEVICE ON-LINE ADAPTING DISTURBANCE OBSERVER FILTER

(71) Applicant: Western Digital Technologies, Inc., Irvine, CA (US)

(72) Inventors: Wei Xi, Mission Viejo, CA (US); Young-Hoon Kim, Cupertino, CA (US); Kuang-Yang Tu, Irvine, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/563,837

(22) Filed: Dec. 8, 2014

Related U.S. Application Data (63) Continuation-in-part of application No. 14/179,268, filed on Feb. 12, 2014.

(60) Provisional application No. 61/933,079, filed on Jan. 29, 2014.

(51) Int. Cl.
  *G11B 27/36* (2006.01)
  *G11B 21/02* (2006.01)
  *G11B 5/596* (2006.01)

(52) U.S. Cl.
  CPC ........ *G11B 5/59694* (2013.01); *G11B 5/59655* (2013.01)

(58) Field of Classification Search
  None
  See application file for complete search history.

(56) References Cited

U.S. PATENT DOCUMENTS

| | | |
|---|---|---|
| 5,550,685 A | 8/1996 | Drouin |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |

(Continued)

OTHER PUBLICATIONS

Notice of Allowance dated Feb. 5, 2015 from U.S. Appl. No. 14/179,268, 5 pages.

(Continued)

*Primary Examiner* — K. Wong (57) ABSTRACT

A data storage device is disclosed comprising a head actuated over a disk comprising tracks defined by servo sectors. A location of the head is generated based on the servo sectors, and a position error signal (PES) representing a difference between a target location for the head and the measured location for the head is generated. An actuator control signal (ACS) is generated in response to the PES, a disturbance compensation signal (DCS) is generated based on the PES and the ACS, and the DCS is filtered with a disturbance observer filter. The DCS is filtered with a plurality of band-pass filters, and an output of one of the band-pass filters is filtered with a peak detection filter configured to detect a peak frequency corresponding to a peak in a frequency response of the band-pass filter, wherein the disturbance observer filter is adjusted based on the peak frequency.

18 Claims, 8 Drawing Sheets

(56) References Cited

U.S. PATENT DOCUMENTS

| | | | |
|---|---|---|---|
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,094 B2 * | 5/2006 | Zhang et al. | 360/77.02 |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,158,329 B1 | 1/2007 | Ryan | |
| 7,158,334 B2 | 1/2007 | Iwashiro | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,212,364 B1 | 5/2007 | Lee | |
| 7,212,374 B1 | 5/2007 | Wang et al | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |
| 7,265,933 B1 | 9/2007 | Phan et al. | |
| 7,289,288 B1 | 10/2007 | Tu | |
| 7,292,403 B2 | 11/2007 | Baek et al. | |
| 7,298,574 B1 | 11/2007 | Melkote et al. | |
| 7,301,717 B1 | 11/2007 | Lee et al. | |
| 7,304,819 B1 | 12/2007 | Melkote et al. | |
| 7,319,570 B2 | 1/2008 | Jia et al. | |
| 7,330,019 B1 | 2/2008 | Bennett | |
| 7,330,327 B1 | 2/2008 | Chue et al. | |
| 7,333,280 B1 | 2/2008 | Lifchits et al. | |
| 7,333,290 B1 | 2/2008 | Kupferman | |
| 7,339,761 B1 | 3/2008 | Tu et al. | |
| 7,365,932 B1 | 4/2008 | Bennett | |
| 7,388,728 B1 | 6/2008 | Chen et al. | |

(56) References Cited

U.S. PATENT DOCUMENTS

| | | |
|---|---|---|
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,564,644 B2 | 7/2009 | Kim et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,633,704 B2 * | 12/2009 | Supino et al. ............... 360/75 |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,068,307 B2 * | 11/2011 | Takaishi ............... 360/77.04 |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 * | 12/2013 | Xi et al. ............... 360/78.05 |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |

(56) References Cited

U.S. PATENT DOCUMENTS

| | | |
|---|---|---|
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,922,938 B1 * | 12/2014 | Chen et al. ............ 360/75 |
| 9,001,454 B1 | 4/2015 | Kim et al. |
| 9,053,726 B1 | 6/2015 | Kim et al. |
| 2004/0213100 A1 | 10/2004 | Iwashiro |
| 2005/0096793 A1 | 5/2005 | Takeuchi |
| 2007/0064334 A1 | 3/2007 | Jia et al. |
| 2007/0189375 A1 | 8/2007 | Kisaka |
| 2010/0035085 A1 | 2/2010 | Jung et al. |
| 2012/0284493 A1 | 11/2012 | Lou et al. |
| 2013/0003219 A1 | 1/2013 | DeRosa et al. |
| 2013/0120870 A1 | 5/2013 | Zhou et al. |
| 2013/0148240 A1 | 6/2013 | Ferris et al. |

OTHER PUBLICATIONS

Office Action dated Sep. 5, 2014 from U.S. Appl. No. 14/179,268, 5 pages.

Phillip A. Regalia, "An improved lattice-based adaptive IIR notch filter," IEEE Transactions on Signal Processing, vol. 39, No. 9, Sep. 1991.

Regalia, et al., "The digital all-pass filter: a versatile signal processing building block," Proceedings of the IEEE, Jan. 1988, vol. 76, Issue 1, pp. 19-37.

Rajan, et al., "Efficient approximation for the arctangent function," Signal Processing Magazine, IEEE, May 2006, vol. 23, Issue 3, pp. 108-111.

* cited by examiner

DATA STORAGE DEVICE ON-LINE ADAPTING DISTURBANCE OBSERVER FILTER

CROSS REFERENCE TO RELATED APPLICATION(S)

This application is a continuation-in-part of co-pending U.S. patent application Ser. No. 14/179,268 filed on Feb. 12, 2014, entitled "DATA STORAGE DEVICE ON-LINE ADAPTING DISTURBANCE OBSERVER FILTER," to Young-Hoon Kim et al, which claims the benefit of U.S. Provisional Application No. 61/933,079 filed on Jan. 29, 2014, entitled "DISK DRIVE ON-LINE ADAPTING DISTURBANCE OBSERVER FILTER," to Young-Hoon Kim et al, both of which are hereby incorporated by reference in their entirety.

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
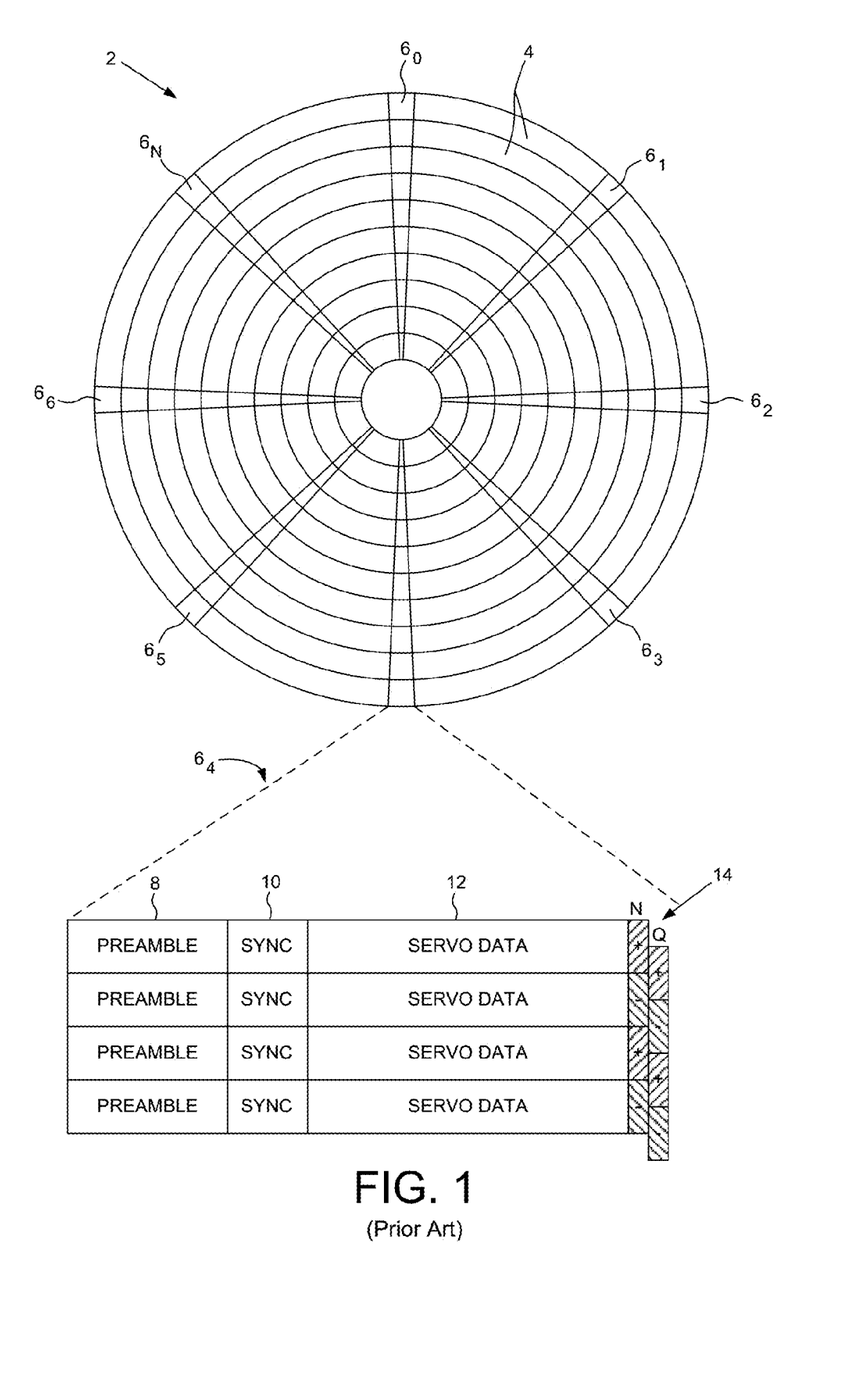
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

DETAILED DESCRIPTION

Figure 2A:
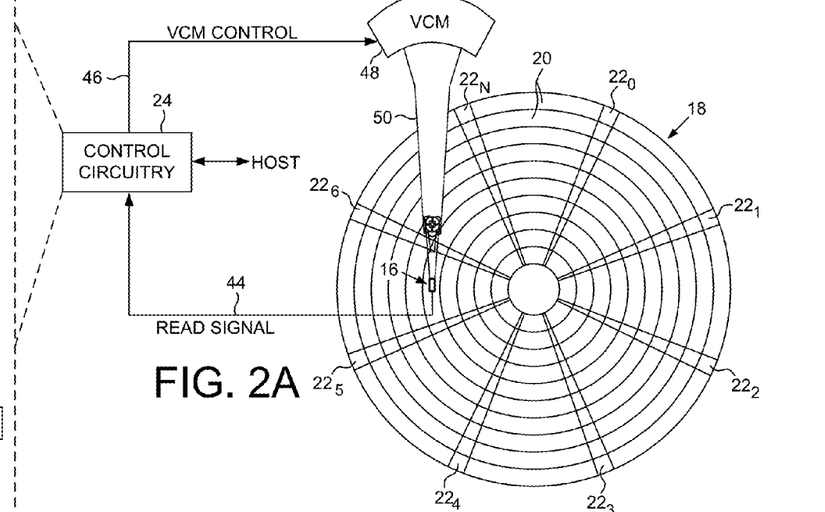
FIG. 2A shows a data storage device in the form of a disk drive according to an embodiment comprising a head actuated over a disk.

FIG. 2A shows a data storage device in the form of a disk drive according to an embodiment comprising a head 16 actuated over a disk 18 comprising tracks 20 defined by servo sectors $22_0$-$22_N$. The disk drive further comprises control circuitry 24 configured to execute the flow diagram of FIG. 2C, wherein a location of the head over the disk is measured based on the servo sectors (block 26), and a position error signal (PES) is generated representing a difference between a target location for the head and the measured location for the head (block 28). An actuator control signal (ACS) is generated in response to the PES (block 30), a disturbance compensation signal (DCS) is generated based on the PES and the ACS (block 32), and the DCS is filtered with a disturbance observer filter (block 34). The ACS is adjusted based on an output of the disturbance observer filter (block 36), and the head is actuated over the disk based on the adjusted ACS (block 38). The DCS is filtered with a plurality of band-pass filters (block 40), and an output of one of the band-pass filters is filtered (block 41) with a peak detection filter 43 (FIG. 2B) configured to detect a peak frequency corresponding to a peak in a frequency response of the band-pass filter, wherein the disturbance observer filter is adjusted based on the peak frequency (block 42).

In the embodiment of FIG. 2A, the control circuitry 24 processes a read signal 44 emanating from the head 16 to demodulate the servo sectors $22_0$-$22_N$ and generate a position error signal (PES) representing an error between the actual position of the head and a target position relative to a target track. A servo control system in the control circuitry 24 filters the PES using a suitable compensation filter to generate a control signal 46 applied to a voice coil motor (VCM) 48 which rotates an actuator arm 50 about a pivot in order to actuate the head 16 radially over the disk 18 in a direction that reduces the PES. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 2B:
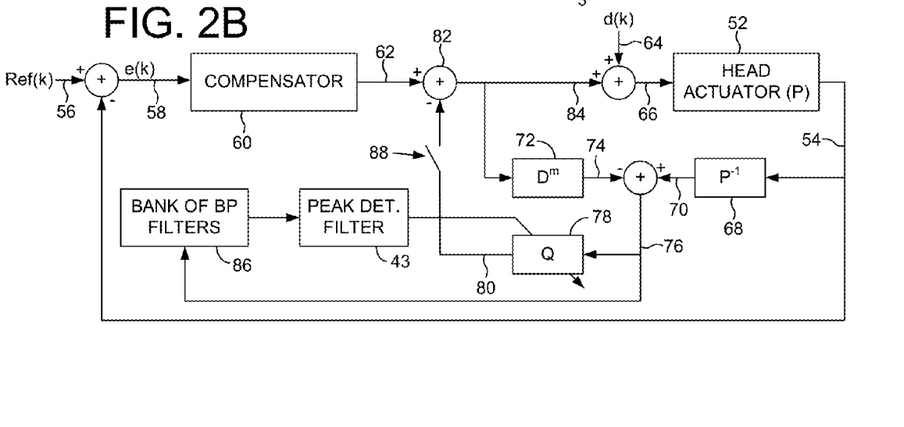
FIG. 2B shows control circuitry according to an embodiment for actuating the head over a disk using a disturbance observer filter.
Figure 2C:
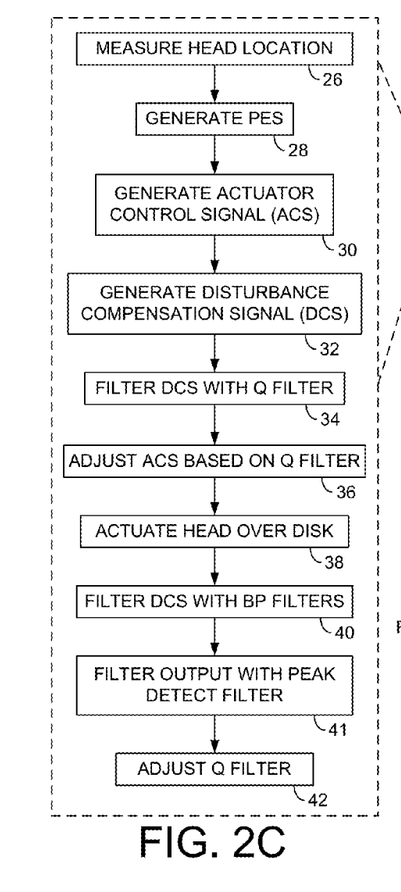
FIG. 2C is a flow diagram according to an embodiment wherein the disturbance observer filter is adjusted based on a plurality of band-pass filters for filtering a disturbance compensation signal (DCS), wherein an output of one of the band-pass filter is filtered with a peak detection filter to detect a peak frequency corresponding to a peak in a frequency response of the band-pass filter.

FIG. 2B shows an example servo control system implemented by the control circuitry 24, wherein the output of a head actuator 52 represents the measured location of the head 16 over the disk 18 based on the servo sectors $22_0$-$22_N$. The measured location 54 is subtracted from a target location 56 to generate the PES 58. A compensator 60 processes the PES 58 to generate the ACS 62. A disturbance affecting the disk drive (e.g., a vibration) is modeled in FIG. 2B as a disturbance d(k) 64 added into the control signal 66 applied to the head actuator 52. To compensate for this disturbance d(k) 64, the servo control system comprises a disturbance compensator comprising a disturbance observer including a filter $P^{-1}$ 68 having an inverse transfer function of the head actuator 52 which generates an inverse signal 70 based on the output 54 of the head actuator 52 (the measured head location). The inverse signal 70 therefore represents the input 66 to the head actuator 52, including the effect of the disturbance d(k) 64. The ACS 58 is delayed 72 by m sample periods $T_s$ ($z^{-m}$) to account for the phase delay of the head actuator 52, and the delayed signal 74 is subtracted from the inverse signal 70. The resulting disturbance compensation signal (DCS) 76 is filtered by a disturbance observer filter 78 (e.g., a band-pass filter) having a target center frequency $\omega_0$, bandwidth, and gain corresponding to the expected frequency of the disturbance d(k) 64. The output 80 of the disturbance observer filter 78 represents an estimate of the disturbance $d_{est}$(k−m) 64 which is subtracted from the disturbance d(k) 64 at adder 82, thereby adjusting the ACS 62 to generate the adjusted ACS 84 which effectively cancels the effect of the disturbance d(k) 64 on the head actuator 52. In the embodiment of FIG. 2B, the DCS 76 is filtered by a bank of band-pass filters 86 which are then used to adjust the disturbance observer filter 78. For example, in one embodiment illustrated in the magnitude responses of FIG. 3A, the pass-band of each band-pass filters 86 covers a particular frequency range, wherein collectively the pass bands cover a range of disturbance frequencies that may be affecting the disk drive. FIG. 3C illustrates an example magnitude response of the PES 58 while a disturbance d(k) 64 is affecting the disk drive, wherein the magnitude response of the PES comprises two peaks at two different frequencies, and each peak comprises a particular magnitude and a particular bandwidth. FIG. 3B illustrates a corresponding output of each band-pass filter 86 while the disturbance d(k) 64 is affecting the disk drive. Accordingly, in one embodiment the outputs of the band-pass filters 86 (such as shown in FIG. 3B) are evaluated to determine a desired center frequency, gain, and bandwidth of the disturbance observer filter 78. In one embodiment, the disturbance observer filter 78 comprises multiple band-pass filters which are each adjusted to compensate for multiple peak frequencies of the disturbance d(k) 64. In the example of FIG. 3C, the disturbance observer filter 78 may comprise two band-pass filters each adjusted to comprise a center frequency, gain, and bandwidth corresponding to the two peak frequencies of the disturbance d(k) 64 as identified using the band-pass filters 86. In one embodiment illustrated in FIG. 3A, each of the band-pass filters 86 comprises a gain based on a torque sensitivity function of the control circuitry shown in FIG. 2B so that the outputs of the band-pass filters 86 more accurately represent the potential disturbance spectrum.

In one embodiment, the disturbance observer filter 78 in the embodiment of FIG. 2B comprises:

$$gQ_0(e^{j\omega_i})$$

where g is a gain and $Q_0(e^{j\omega_i})$ is a band-pass filter. In one embodiment, the band-pass filter $Q_0(e^{j\omega_i})$ comprises a lattice-based filter:

$$Q_0(z) = \frac{a_0(z^2 - 1)}{z^2 + b_1 z + b_2}$$

where the above filter coefficients may be calculated according to:

$$a_0 = \frac{1 - k_2}{2}, \quad b_1 = k_1(1 - k_2), \quad b_2 = k_2$$

in which $k_1$ and $k_2$ are determined by the center frequency $F_c$ and the bandwidth B as follows:

$$k_1 = -\cos\omega_c, \quad k_2 = \frac{1 - \tan(\Omega_B/2)}{1 + \tan(\Omega_B/2)}$$

where $\omega_c = 2\pi F_c T_s$ and $\Omega_B = 2\pi B T_s$.

Any suitable algorithm may be employed to adjust the disturbance observer filter 78 based on the outputs of the band-pass filters 86. In one embodiment, the control circuitry 24 of FIG. 2A is configured to adjust the center frequency of the disturbance observer filter 78 based on a peak output of the band-pass filters 86 that also exceeds a threshold, and configured to adjust the bandwidth of the disturbance observer filter 78 based on the number of adjacent outputs of the band-pass filters 86 that also exceed the threshold. In one embodiment, the control circuitry 24 of FIG. 2A is configured to adjust the gain of the disturbance observer filter according to:

$$\min\left(1, \max\left(G_{min}, (1 - G_{min})\frac{mag_{pk} - MLMG}{MLFG - MLMG} + G_{min}\right)\right)$$

where $G_{min}$ represents a minimum gain, $mag_{pk}$ represents a magnitude of an output of one of the band-pass filters (corresponding to a peak in the spectrum of the DCS 76), MLMG represents a magnitude level of minimum gain, and MLFG represents a magnitude level of full gain.

Figure 4:
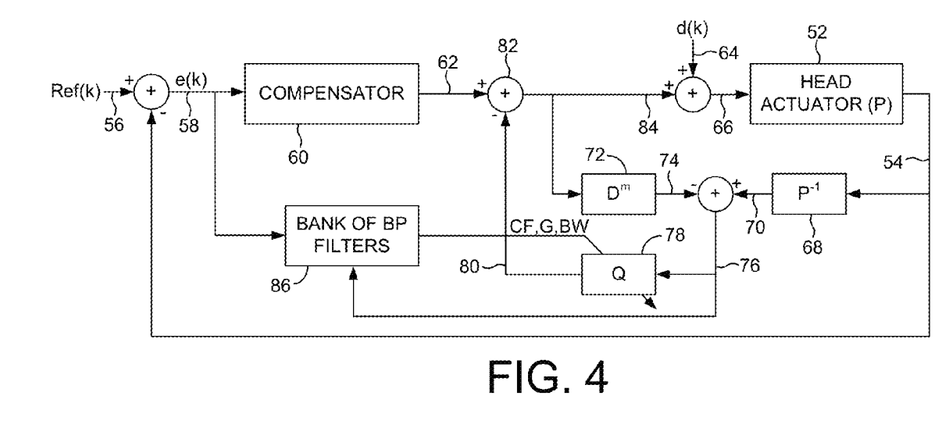
FIG. 4 shows an embodiment wherein at least one of a center frequency, a gain, and a bandwidth of the disturbance observer filter is adjusted based on the band-pass filters.

FIG. 4 shows control circuitry according to an embodiment wherein the bank of band-pass filters 86 also processes the PES 58 to verify that the DCS 76 represents a disturbance 64 of significant magnitude that is affecting the disk drive. For example, if the magnitude of the PES 58 does not exceed a threshold, the outputs of the band-pass filters 86 may be ignored so that the disturbance observer filter 78 is not adjusted. In one embodiment, the disturbance compensation may be disabled (e.g., by opening switch 88 in FIG. 2A) while evaluating the DCS 76 (and optionally the PES 58) in order to adjust the disturbance observer filter 78. In another embodiment described below, the disturbance observer filter 78 may be adjusted based on the outputs of the band-pass filters 86 while the disturbance compensation is enabled (e.g., while switch 88 in FIG. 2A is closed).

Figure 5:
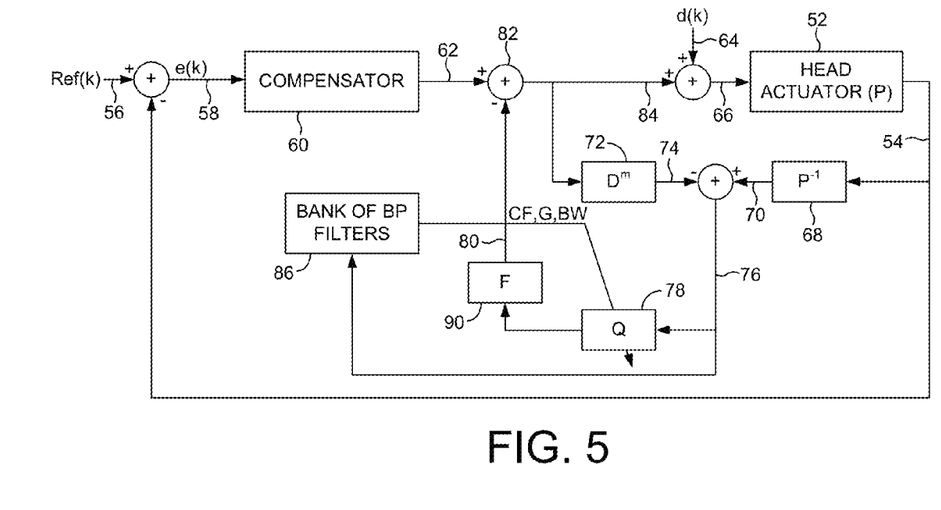
FIG. 5 shows an embodiment wherein an output of the disturbance observer filter is further filtered to compensates for the effect of a delay when a disturbance d(k) affecting the disk drive comprises a high frequency.

FIG. 5 shows an embodiment wherein the disturbance compensation further comprises a filter F 90 which compensates for the effect of the delay 72 when the disturbance d(k) 64 comprises a high frequency. That is, when the disturbance d(k) 64 comprises a high frequency, the delay 72 may induce a mismatch between the target center frequency of the disturbance observer filter 78 and the actual center frequency of the disturbance observer filter 78. At high frequencies, the inverse filter $P^{-1}(z^{-1})$ 68 may be modeled as $z^{-m}P_n^{-1}(z^{-1})$ and the relationship between the PES 58 and the disturbance d(k) 64 may be represented as:

$$e(k) = -S_1(z^{-1})P(z^{-1})d(k)$$

where:

$$S_1(z^{-1}) = S_0(z^{-1})(1 - z^{-m}Q(z^{-1})F(z^{-1})).$$

For optimal disturbance cancellation at $\omega_i$, the following equation is minimized:

$$\min: |1 - e^{jm\omega_i}Q(e^{j\omega_i})F(e^{j\omega_i})|$$

In one embodiment, the filter F 90 comprises a finite impulse response (FIR) filter of the form:

$$F(z^{-1}) = c_0 + c_1 z^{-1}.$$

When the disturbance observer filter 78 comprises the above described lattice-based band-pass filter, the solution that will minimize the above equation is:

$$c_0 = \frac{\sin((m+1)\omega_i)}{\sin(\omega_i)}, \quad c_1 = \frac{-\sin(m\omega_i)}{\sin(\omega_i)}$$

In an embodiment described below, the filter F 90 of FIG. 5 may facilitate adjusting the disturbance observer filter 78 based on the outputs of the band-pass filters 86 while the disturbance compensation is enabled (e.g., while switch 88 in FIG. 2A is closed) without rendering the servo control system unstable.

Figure 6:
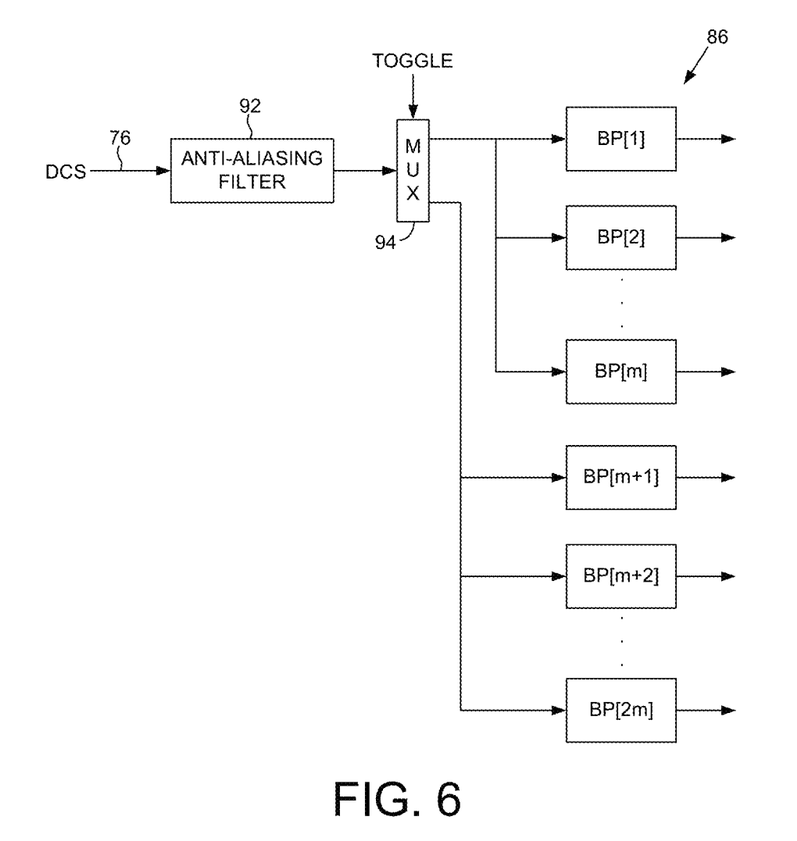
FIG. 6 shows an embodiment wherein the band-pass filters comprise two banks, and each bank filters every other sample of the DCS.

FIG. 6 shows an embodiment wherein the bank of band-pass filters 86 comprises a first bank comprising band-pass filters BP[1] to BP[m] and a second bank comprising band-pass filters BP[m+1] to BP[2m]. The DCS 76 is filtered with an anti-aliasing filter 92, and the resulting output samples are processed in an even an odd interleave. That is, multiplexer 94 is configured to transmit the even samples to the first bank of band-pass filters and configured to transmit the odd samples to the second bank of band-pass filters. This down-sampling technique may reduce the computational time and complexity of the band-pass filters 86 without a significant reduction in performance.

Figure 7A:
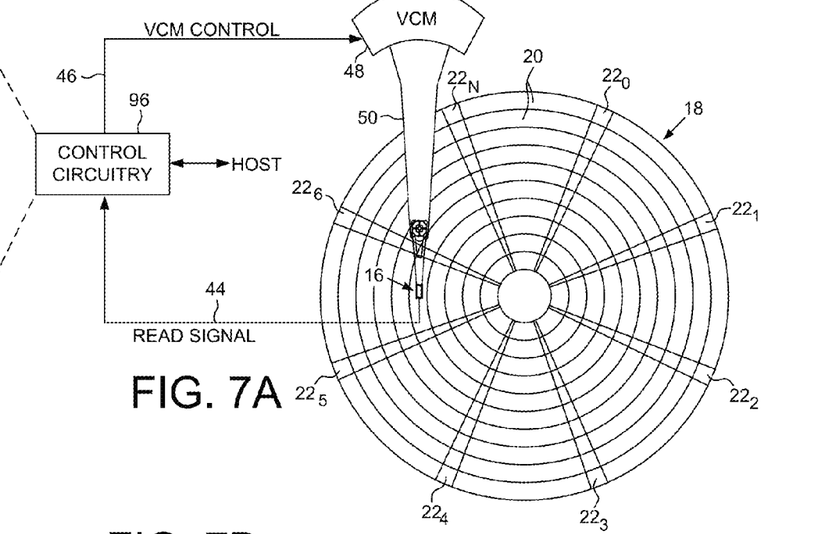
FIG. 7A shows a data storage device in the form of a disk drive according to an embodiment comprising a head actuated over a disk.

FIG. 7A shows a disk drive according to an embodiment comprising a head 16 and a disk 18 comprising tracks 20 defined by servo sectors $22_0$-$22_N$. The disk drive further comprises control circuitry 96 configured to execute the flow diagram of FIG. 7C, wherein a location of the head over the disk is measured based on the servo sectors (block 98), and a position error signal (PES) is generated representing a difference between a target location for the head and the measured location for the head (block 100). An actuator control signal (ACS) is generated in response to the PES (block 102), and a disturbance compensation signal (DCS) is generated based on the PES and the ACS (block 104). The DCS is filtered with a disturbance observer filter (block 106), and the ACS is adjusted based on an output of the disturbance observer filter while concurrently adjusting at least one of a center frequency, a gain, and a bandwidth of the disturbance observer filter (block 108). The head is actuated over the disk based on the adjusted ACS (block 110).

Figure 7B:
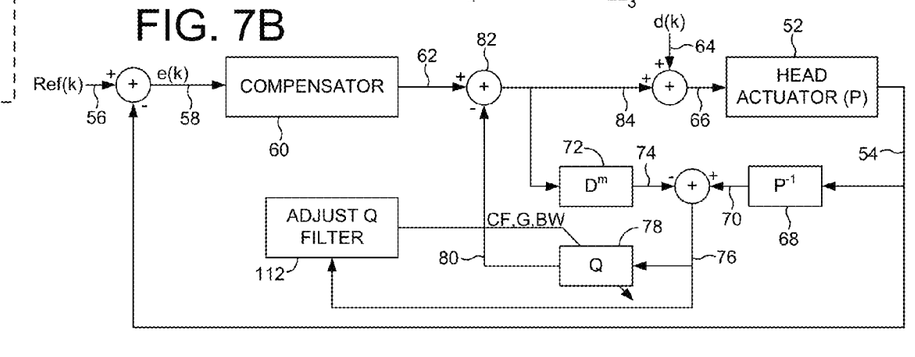
FIG. 7B shows control circuitry according to an embodiment for actuating the head over a disk using a disturbance observer filter.
Figure 7C:
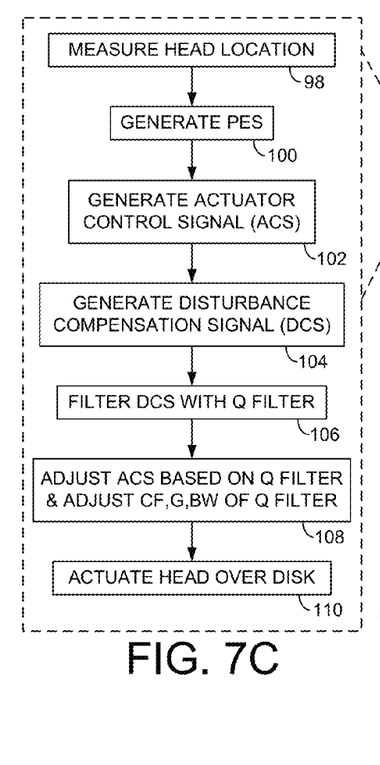
FIG. 7C is a flow diagram according to an embodiment wherein an actuator control signal (ACS) is adjusted based on an output of the disturbance observer filter while concurrently adjusting at least one of a center frequency, a gain, and a bandwidth of the disturbance observer filter.

FIG. 7B shows a servo control system implemented by the control circuitry 24 similar to the embodiment of FIG. 2B except that block 112 may implement any suitable algorithm to adjust at least one of a center frequency, a gain, and a bandwidth of the disturbance observer filter 78. For example, in one embodiment block 112 comprises a plurality of band-pass filters that filter the DCS 76 as described above in order to adjust the center frequency, the gain, and the bandwidth of the disturbance observer filter 78 based on a peak output of the band-pass filters. In one embodiment, block 112 operates to adjust the disturbance observer filter 78 while the disturbance observer is enabled (i.e., while the output 80 of the disturbance observer filter 78 adjust the ACS 62 to compensate for the disturbance d(k) 64).

In one embodiment, the disturbance observer filter 78 may comprise a lattice-based filter as described above which may help maintain the stability of the servo control system shown in FIG. 7B while adjusting at least one of the center frequency, the gain, and the bandwidth of the disturbance observer filter 78. In another embodiment, the servo control system shown in FIG. 7B may comprise the filter 90 shown in FIG. 5 which compensates for the effect of the delay 72 when the disturbance d(k) 64 comprises a high frequency as described above. The filter 90 may also improve the stability of the servo control system while adjusting at least one of the center frequency, the gain, and the bandwidth of the disturbance observer filter 78.

Figure 8:
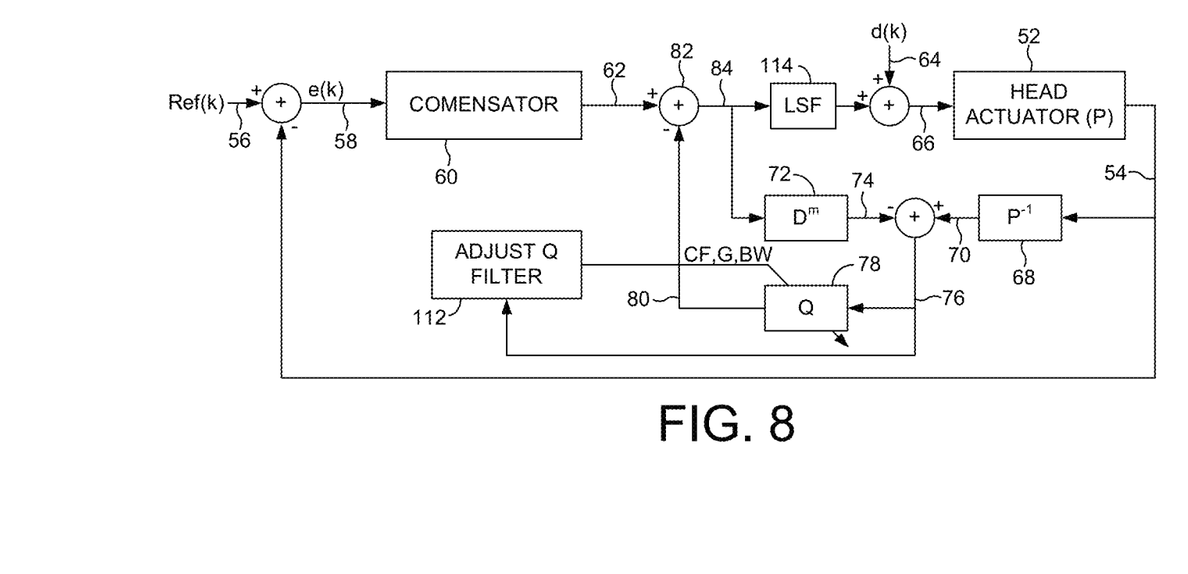
FIG. 8 shows control circuitry according to an embodiment wherein the adjusted ACS is filtered with a loop shaping filter (LSF).

FIG. 8 shows another embodiment wherein the servo control system may comprise a loop shaping filter (LSF) 114 comprising a plurality of second-order filters:

$$\prod_i \frac{A_i(z^{-1})}{B_i(z^{-1})}.$$

The LSF 114 is configured to filter the adjusted ACS 84, for example, to attenuate a peak in the error rejection curve of the servo control system, thereby improving the stability of the servo control system while adjusting at least one of the center frequency, the gain, and the bandwidth of the disturbance observer filter 78.

Figure 3A:
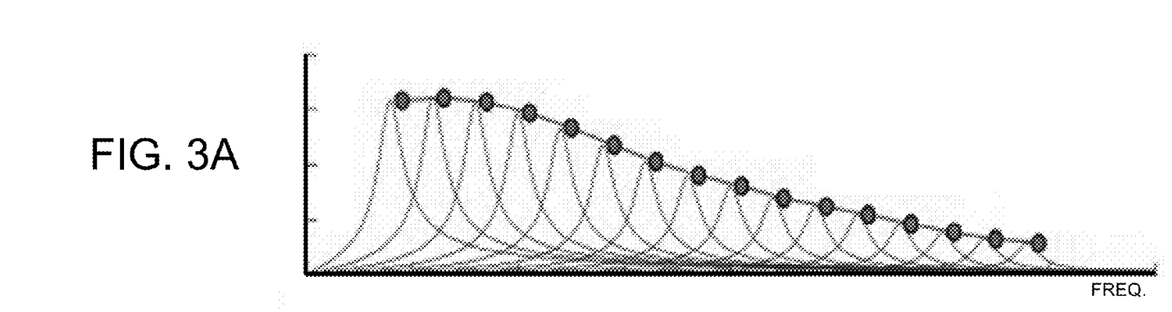
FIG. 3A shows a magnitude spectrum for each of a plurality of the band-pass filters, wherein each of the band-pass filters comprises a gain based on a torque sensitivity function of the control circuitry.
Figure 3B:
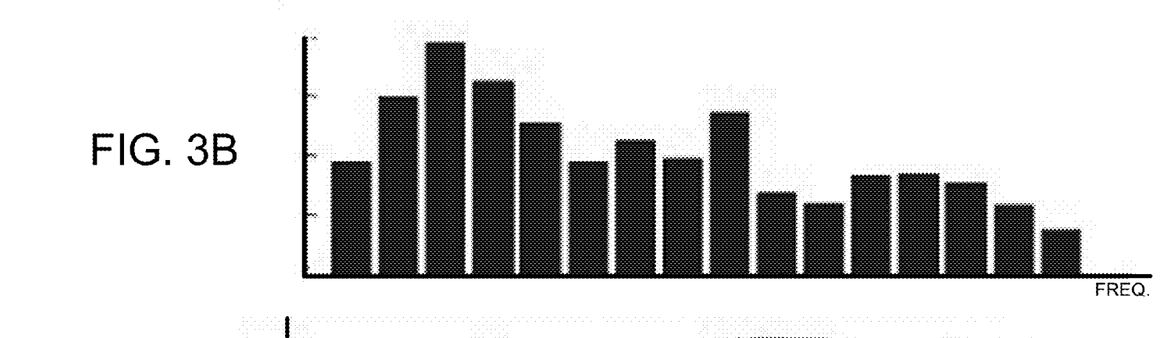
FIG. 3B shows the output of each of the band-pass filters.
Figure 3C:
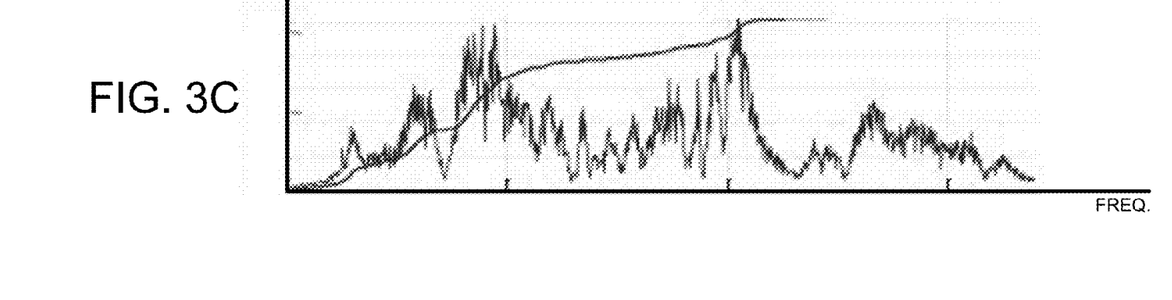
FIG. 3C shows a magnitude spectrum of a PES when the disk drive is subject to a disturbance.

In the embodiment illustrated in FIG. 3A, the frequency response of each band-pass filter 86 spans a target band of frequencies within which the peak frequency of the disturbance d(k) 64 may manifest. In one embodiment, when the disturbance frequency is identified by one of the band-pass filters as described above, the detected disturbance frequency may be selected as the center of the frequency band spanned by the band-pass filter. In another embodiment, the accuracy in detecting the disturbance frequency may be increased by employing a peak detection filter 43 as shown in FIG. 2B which is configured to detect a peak frequency corresponding to a peak in a frequency response of the band-pass filter. That is, the peak detection filter 43 may be configured to more accurately detect the actual frequency of the disturbance d(k) 64 by detecting the peak frequency within the frequency band spanned by the corresponding band-pass filter 86. In one embodiment, the center frequency of the disturbance observer filter is then adjusted based on the peak frequency detected by the peak detection filter 43.

The peak detection filter 43 shown in FIG. 2B may be employed in any of the embodiments described above, including the embodiments where the peak detection filter is not shown explicitly in the figures. In one embodiment, a single peak detection filter 43 may be employed for filtering the output of the selected band-pass filter that identifies the disturbance d(k) 64. In another embodiment, a peak detection filter 43 may be implemented for each of the band-pass filters and may operate in parallel to filter the output of each band-pass filter. In addition, any suitable peak detection filter 43 may be employed in the embodiments, wherein the following description of a peak detection filter 43 comprising an adaptive notch filter is merely an example of a suitable peak detection filter.

Figure 9A:
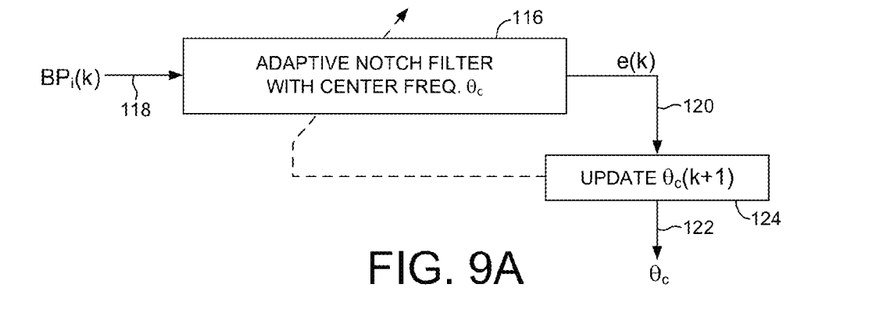
FIG. 9A shows an embodiment wherein the peak detection filter of FIG. 2B comprises an adaptive notch filter.

FIG. 9A shows an embodiment wherein the peak detection filter 43 comprises an adaptive notch filter 116 for filtering the output 118 of one of the band-pass filters BPi. The output of the adaptive notch filter 116 represents an error signal e(k) 120 used to adapt the center frequency $\theta_c$ 122 of the adaptive notch filter 116 at block 124. In one embodiment, the error signal e(k) 120 decreases toward zero as the center frequency $\theta_c$ 122 of the adaptive notch filter 116 aligns with the frequency of the disturbance d(k) 64 (i.e., aligns with the peak frequency in the frequency response of the band-pass filter). Once the center frequency $\theta_c$ 122 converges (e.g., when the error signal e(k) 120 falls below a threshold), the center frequency $\theta_c$ 122 of the adaptive notch filter 116 may be used to adjust the center frequency of the disturbance observer filter 78.

Figure 9B:
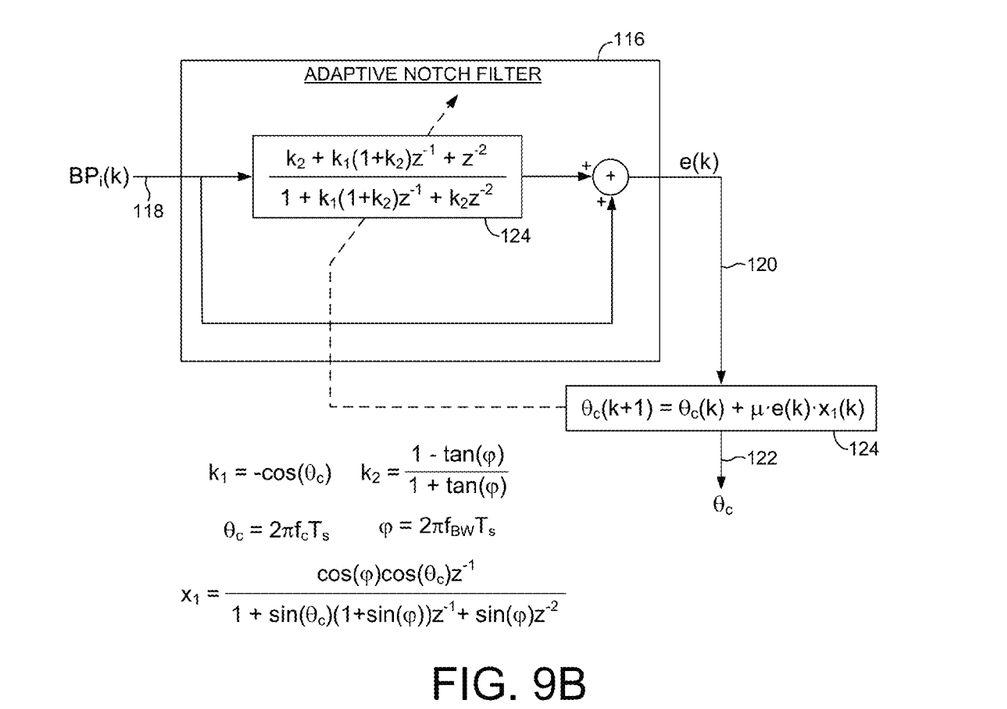
FIG. 9B shows an embodiment wherein the adaptive notch filter comprises an all-pass lattice filter.

Any suitable adaptive notch filter 116 may be employed in the embodiments described herein. FIG. 9B shows an embodiment wherein the adaptive notch filter 116 comprises an all-pass lattice filter 126, where $\theta_c$ and $f_c$ represent the center frequency and bandwidth of the notch filter. The notch filter 116 in this embodiment is implemented by filtering the output 118 of the band-pass filter with the all-pass lattice filter 126 and adding the result to the output 118 of the band-pass filter. The resulting error signal e(k) 120 is used to adjust the center frequency $\theta_c$ of the adaptive notch filter 116 at block 126 according to:

$$\theta_c(k+1)=\theta_c(k)+\mu \cdot e(k) \cdot x_1(k)$$

where $\mu$ is a learning coefficient, and $x_1(k)$ represents a regressor signal corresponding to a first state of the adaptive notch filter. An example of the regressor signal $x_1(k)$ for the adaptive notch filter 116 in this embodiment is illustrated in FIG. 9B. In one embodiment, the initial value for the center frequency $\theta_c$ of the adaptive notch filter 116 is selected as the middle frequency in the frequency band of the corresponding band-pass filter 86.

In one embodiment, the control circuitry 24 in FIG. 2A is further configured to adapt the learning coefficient $\mu$ in the above equation when adjusting the center frequency $\theta_c$ of the adaptive notch filter 116. For example, the learning coefficient $\mu$ may be adapted according to:

$$\mu(k) = 1 \Big/ \sum_{j=0}^{k} \lambda^{k-j} x_1^2(k), \quad 0 << \lambda \le 1.$$

In an alternative embodiment, a simplified algorithm may be employed for adapting the learning coefficient $\mu$ so as to avoid the computation complexity of the above equation (such as computing an inverse). In this alternative embodiment, the control circuitry 24 may be configured to adjust the center frequency $\theta_c$ of the adaptive notch filter 116 according to:

$$\theta_c(k+1)=\theta_c(k)+(e(k) \cdot x_1(k))>>\eta(k)$$

where $\eta(k)$ is an adaptive learning term and ">>" represents the right shift operator. In one embodiment, the adaptive learning term $\eta(k)$ is adapted based on:

$$\eta(k+1)=\gamma \cdot \eta(k)+2(1-\gamma)\log 2(abs(x_1(k)))$$

where $\gamma$ represents a learning coefficient.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk comprising tracks defined by servo sectors;
a head; and
control circuitry configured to:
measure a location of the head over the disk based on the servo sectors;
generate a position error signal (PES) representing a difference between a target location for the head and the measured location for the head;
generate an actuator control signal (ACS) in response to the PES;
generate a disturbance compensation signal (DCS) based on the PES and the ACS;
filter the DCS with a disturbance observer filter;
adjust the ACS based on an output of the disturbance observer filter;
actuate the head over the disk based on the adjusted ACS;
filter the DCS with a plurality of band-pass filters;
filter an output of one of the band-pass filters with a peak detection filter configured to detect a peak frequency corresponding to a peak in a frequency response of the band-pass filter; and
adjust the disturbance observer filter based on the peak frequency.

2. The data storage device as recited in claim 1, wherein the peak detection filter comprises an adaptive notch filter.

3. The data storage device as recited in claim 2, wherein the control circuitry is further configured to detect the peak frequency by adjusting a center frequency of the adaptive notch filter.

4. The data storage device as recited in claim 3, wherein the control circuitry is further configured to adjust the center frequency of the adaptive notch filter according to:

$$\theta_c(k+1)=\theta_c(k)+\mu \cdot e(k) \cdot x_1(k)$$

where:
$\theta_c(k)$ represents the center frequency of the adaptive notch filter;
$\mu$ is a learning coefficient;
$e(k)$ represents an output of the adaptive notch filter; and
$x_1(k)$ represents a regressor signal corresponding to a first state of the adaptive notch filter.

5. The data storage device as recited in claim 4, wherein the adaptive notch filter comprises an all-pass lattice filter.

6. The data storage device as recited in claim 4, wherein the control circuitry is further configured to adapt the learning coefficient $\mu$.

7. The data storage device as recited in claim 5, wherein the control circuitry is further configured to adapt the learning coefficient $\mu$.

8. The data storage device as recited in claim 3, wherein the control circuitry is further configured to adjust the center frequency of the adaptive notch filter according to:

$$\theta_c(k+1)=\theta_c(k)+(e(k)\cdot x_1(k))>>\eta(k)$$

where:
$\theta_c(k)$ represents the center frequency of the adaptive notch filter;
$\eta(k)$ is an adaptive learning term;
$e(k)$ represents an output of the adaptive notch filter; and
$x_1(k)$ represents a regressor signal corresponding to a first state of the adaptive notch filter.

9. The data storage device as recited in claim 8, wherein the control circuitry is further configured to adapt the learning term $\eta(k)$ based on:

$$\eta(k+1)=\gamma \cdot \eta(k)+2(1-\gamma)\log 2(abs(x_1(k)))$$

where $\gamma$ represents a learning coefficient.

10. A method of operating a data storage device, the method comprising:
measuring a location of a head over a disk based on servo sectors recorded on the disk;
generating a position error signal (PES) representing a difference between a target location for the head and the measured location for the head;
generating an actuator control signal (ACS) in response to the PES;
generating a disturbance compensation signal (DCS) based on the PES and the ACS;
filtering the DCS with a disturbance observer filter;
adjusting the ACS based on an output of the disturbance observer filter;
actuating the head over the disk based on the adjusted ACS;
filtering the DCS with a plurality of band-pass filters;
filtering an output of one of the band-pass filters with a peak detection filter configured to detect a peak frequency corresponding to a peak in a frequency response of the band-pass filter; and
adjusting the disturbance observer filter based on the peak frequency.

11. The method as recited in claim 10, wherein the peak detection filter comprises an adaptive notch filter.

12. The method as recited in claim 11, further comprising detecting the peak frequency by adjusting a center frequency of the adaptive notch filter.

13. The method as recited in claim 12, further comprising adjusting the center frequency of the adaptive notch filter according to:

$$\theta_c(k+1)=\theta_c(k)+\mu \cdot e(k) \cdot x_1(k)$$

where:
$\theta_c(k)$ represents the center frequency of the adaptive notch filter;
$\mu$ is a learning coefficient;
$e(k)$ represents an output of the adaptive notch filter; and
$x_1(k)$ represents a regressor signal corresponding to a first state of the adaptive notch filter.

14. The method as recited in claim 13, wherein the adaptive notch filter comprises an all-pass lattice filter.

15. The method as recited in claim 13, further comprising adapting the learning coefficient $\mu$.

16. The method as recited in claim 14, further comprising adapting the learning coefficient $\mu$.

17. The method as recited in claim 12, further comprising adjusting the center frequency of the adaptive notch filter according to:

$$\theta_c(k+1)=\theta_c(k)+(e(k)\cdot x_1(k))>>\eta(k)$$

where:
$\theta_c(k)$ represents the center frequency of the adaptive notch filter;
$\eta(k)$ is an adaptive learning term;
$e(k)$ represents an output of the adaptive notch filter; and
$x_1(k)$ represents a regressor signal corresponding to a first state of the adaptive notch filter.

18. The method as recited in claim 17, further comprising adapting the learning term $\eta(k)$ based on:

$$\eta(k+1)=\gamma\cdot\eta(k)+2(1-\gamma)\log 2(\text{abs}(x_1(k)))$$

where $\gamma$ represents a learning coefficient.

\* \* \* \* \*